(12) United States Patent
Switzeny

(10) Patent No.: US 7,984,678 B2
(45) Date of Patent: Jul. 26, 2011

(54) TRANSPORTING MEANS OF A CHAIR LIFT OR OF A CABLEWAY SYSTEM

(75) Inventor: Kurt Switzeny, Brunnen (CH)

(73) Assignee: Innova Patent GmbH, Wolfurt (AT)

( * ) Notice: Subject to any disclaimer, the term of this patent is extended or adjusted under 35 U.S.C. 154(b) by 405 days.

(21) Appl. No.: 12/136,417

(22) Filed: Jun. 10, 2008

(65) Prior Publication Data

US 2009/0058170 A1 Mar. 5, 2009

(30) Foreign Application Priority Data

Aug. 30, 2007 (AT) ................. A 1361/2007

(51) Int. Cl.
*B61B 11/00* (2006.01)
(52) U.S. Cl. .................. 105/149.2; 104/173.2
(58) Field of Classification Search ............... 104/173.1, 104/173.2; 105/149.1, 149.2
See application file for complete search history.

(56) References Cited

U.S. PATENT DOCUMENTS

| | | | | |
|---|---|---|---|---|
| 4,784,065 A | * | 11/1988 | Brochand | ........... 104/173.2 |
| 6,520,573 B2 | | 2/2003 | Österle | |
| 6,550,394 B1 | * | 4/2003 | Polley | ............. 105/164 |
| 6,691,624 B2 | | 2/2004 | Albrich | |
| 7,002,319 B2 | | 2/2006 | Hinteregger | |
| 7,377,220 B2 | | 5/2008 | Coudurier et al. | |
| 2007/0095244 A1 | | 5/2007 | Sutter et al. | |

FOREIGN PATENT DOCUMENTS

| | | |
|---|---|---|
| EP | 0748732 A1 | 12/1996 |
| EP | 0808757 A1 | 11/1997 |
| EP | 1151903 A2 | 11/2001 |
| EP | 1331151 A1 | 7/2003 |
| EP | 1396407 A1 | 3/2004 |
| EP | 1671867 A1 | 6/2006 |
| EP | 1780091 A2 | 5/2007 |
| WO | 2008020021 A1 | 2/2008 |

OTHER PUBLICATIONS

European Search Report dated Feb. 9, 2010.

* cited by examiner

*Primary Examiner* — S. Joseph Morano
*Assistant Examiner* — Zachary Kuhfuss
(74) *Attorney, Agent, or Firm* — Laurence A. Greenberg; Werner H. Stemer; Ralph E. Locher

(57) ABSTRACT

A transporting means of a chair lift or of a cableway system has a safety bar, a device for closing the safety bar, an energy storage device, a device for charging the energy storage device and a blocking device which prevents the energy storage device from being charged. The blocking device can be activated and deactivated. The opening of the safety bar is prevented in the active state of the blocking device. The blocking device prevents the safety bar from being opened over at least part of the distance covered by the safety bar between its fully open position and its fully closed position, in particular over the entire distance.

19 Claims, 3 Drawing Sheets

FIG. 1
FIG. 2
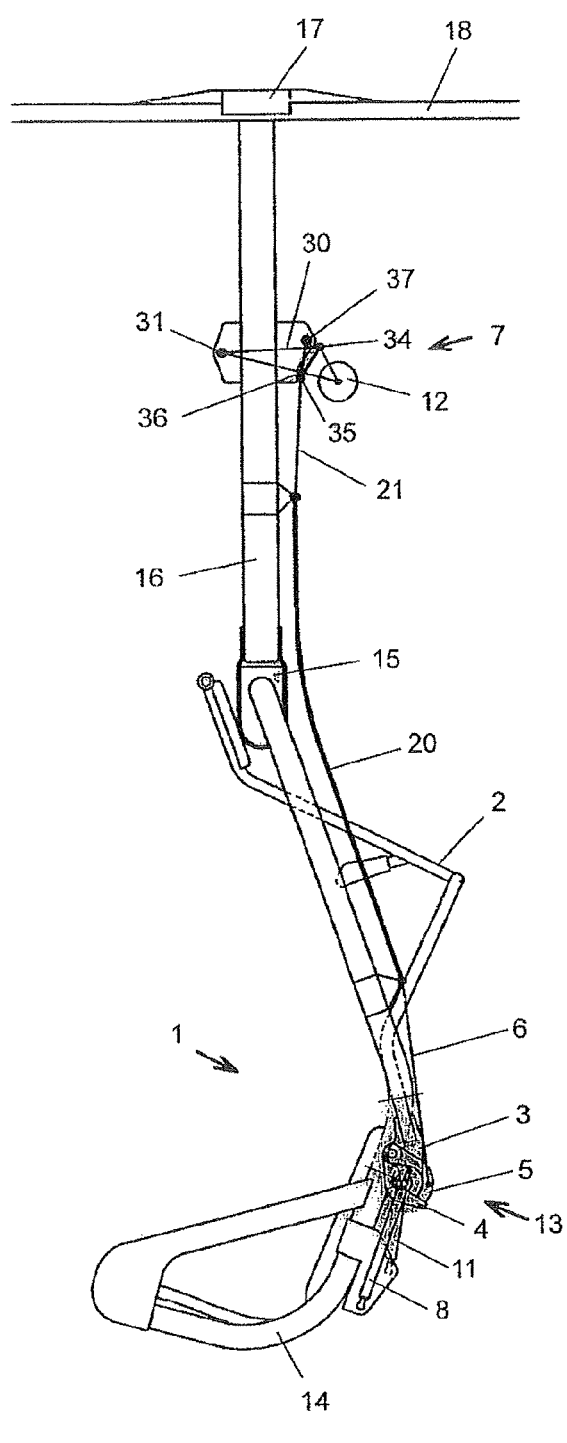
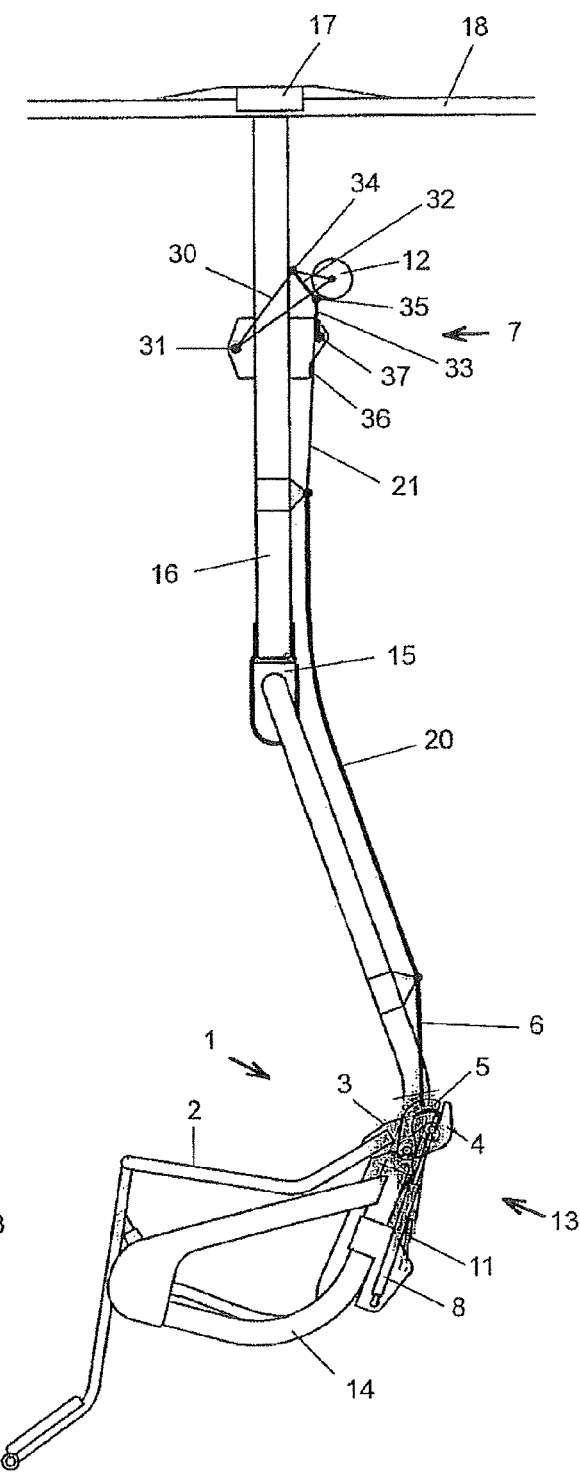

TRANSPORTING MEANS OF A CHAIR LIFT OR OF A CABLEWAY SYSTEM

CROSS-REFERENCE TO RELATED APPLICATION

This application claims the priority, under 35 U.S.C. §119, of Austrian patent application A 1361/2007, filed Aug. 30, 2007; the prior application is herewith incorporated by reference in its entirety.

BACKGROUND OF THE INVENTION

Field of the Invention

The invention relates to a transporting means of a chair lift or of a cableway system, having a frame, which is connected to a load-bearing bar coupled to a conveying cable, having a safety bar, having a device for closing the safety bar, having an energy storage device, having a device for charging the energy storage device, and having a blocking device which prevents the energy storage device from being charged. It is possible for the blocking device to be activated and deactivated, opening of the safety bar being prevented in the active state of the blocking device.

In order to prevent the passengers from falling out of, or slipping off, transporting means of a chair lift or of a cableway system, these transporting means have closure or safety bars. The safety bars can be pivoted from a position in which they are located above the passengers into a position in which a crossmember extends in front of the passengers, over their thighs.

Safety bars which are not closed automatically upon departure from a station of the chair lift or of the cableway system and safety bars which are forcibly closed in the station by means of a rail and a cable pull are known. If, in the case of the latter safety bars, an overload safeguard is provided, in order to prevent passengers from being crushed or pinched, then, in the case of these embodiments, a correspondingly long travel path of the transporting means is required in order for the safety bar to be closed. The traveling speed of the transporting means cannot be too high over this travel path since, otherwise, the closing movement of the safety bar is executed too quickly and associated problems may arise.

The disadvantage with the above-mentioned safety bars is that it is possible for passengers either not to close the safety bar upon departure from station or to open the safety bar en route from the boarding station to the disembarking station and thus to put themselves at risk.

SUMMARY OF THE INVENTION

It is accordingly an object of the invention to provide a transporting means of a chair lift or of a cableway system, which overcomes the above-mentioned disadvantages of the heretofore-known devices and methods of this general type and which rules out the above-mentioned risks.

With the foregoing and other objects in view there is provided, in accordance with the invention, a transporting means of a chair lift or of a cableway system, comprising:

a frame connected to a load-bearing bar supported on a conveying cable;

a safety bar movably disposed between a fully open position and a fully closed position;

a device for closing the safety bar;

an energy storage device, a device for charging the energy storage device, and a blocking device for preventing the energy storage device from being discharged, the blocking device having an activated state and a deactivated state;

the blocking device, in the activated state, preventing the safety bar from being opened over at least a part of a distance covered between the fully open position and the fully closed position. Preferably, the blocking device is active to prevent opening over the entire distance, from fully open to fully closed.

In other words, the transporting means according to the invention are characterized in that the blocking device prevents the safety bar from being opened over at least part of the distance between its fully open position and its fully closed position. This ensures that the safety bar remains closed throughout travel from one station to the next station since, once the safety bar has been closed in, or just after, a station, it is not readily possible for the safety bar to be opened again. It is only at the next station that the safety bar can be opened again.

In order to protect the passengers, the closing operation of the safety bar can be halted, by a slight opposing force being applied, but the safety bar cannot be opened again.

In a particularly preferred embodiment of the transporting means according to the invention, the device for closing the safety bar and the blocking device are advantageously formed from the same group of interacting components. Within the context of the invention, however, it is also possible for the device for closing the safety bar and the blocking device to be formed from different groups of components.

In accordance with an added feature of the invention, the blocking device and the device for closing the safety bar are comprises of the same group of interacting components.

In accordance with an additional feature of the invention, the device for charging the energy storage device is mounted on the load-bearing bar.

In accordance with another feature of the invention, the device for charging the energy storage device includes a pivotally mounted carrier. In a preferred embodiment, the charging device is pivotally mounted for pivoting through a dead center.

In accordance with a further feature of the invention, the device for charging the energy storage device includes a toggle joint.

In accordance with yet an added feature of the invention, the device for charging the energy storage device includes a guide roller.

In accordance with yet an additional feature of the invention, the safety bar is formed with an extension, the blocking device has a bottom lever and a top lever, the bottom lever has a free end formed with an abutment surface for the extension of the safety bar, and the top lever has an abutment surface for blocking means preventing the energy storage device from being charged. Preferably, bottom lever and the top lever are mounted on the extension of the safety bar. The bottom lever may be connected to the energy storage device, and the energy storage device may be pivotally mounted.

In accordance with again an added feature of the invention, the energy storage device is a spring, in particular a pneumatic compression spring or a gas spring.

In accordance with again another feature of the invention, there is provided a mechanism connecting the blocking device to the device for charging the energy storage device, and the energy storage device is charged by stressing. In a preferred embodiment, the mechanism includes a first rod, a Bowden cable connected to the first rod, and a second rod connected to the Bowden cable. The first rod may be connected to the toggle joint and the second rod may be connected to the top lever.

In accordance with again a further feature of the invention, there is provided a damper pivotally mounted to the frame and the safety bar.

In accordance with a concomitant feature of the invention, the device for stressing the energy storage device is a device for activating a closure of the safety bar.

Other features which are considered as characteristic for the invention are set forth in the appended claims.

Although the invention is illustrated and described herein as embodied in transporting means of a chair lift or of a cableway system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a side elevational view of a chair of a chair lift with the safety bar open;

FIG. 2 is a similar view of the chair with the safety bar closed;

DETAILED DESCRIPTION OF THE INVENTION

Figure 3:
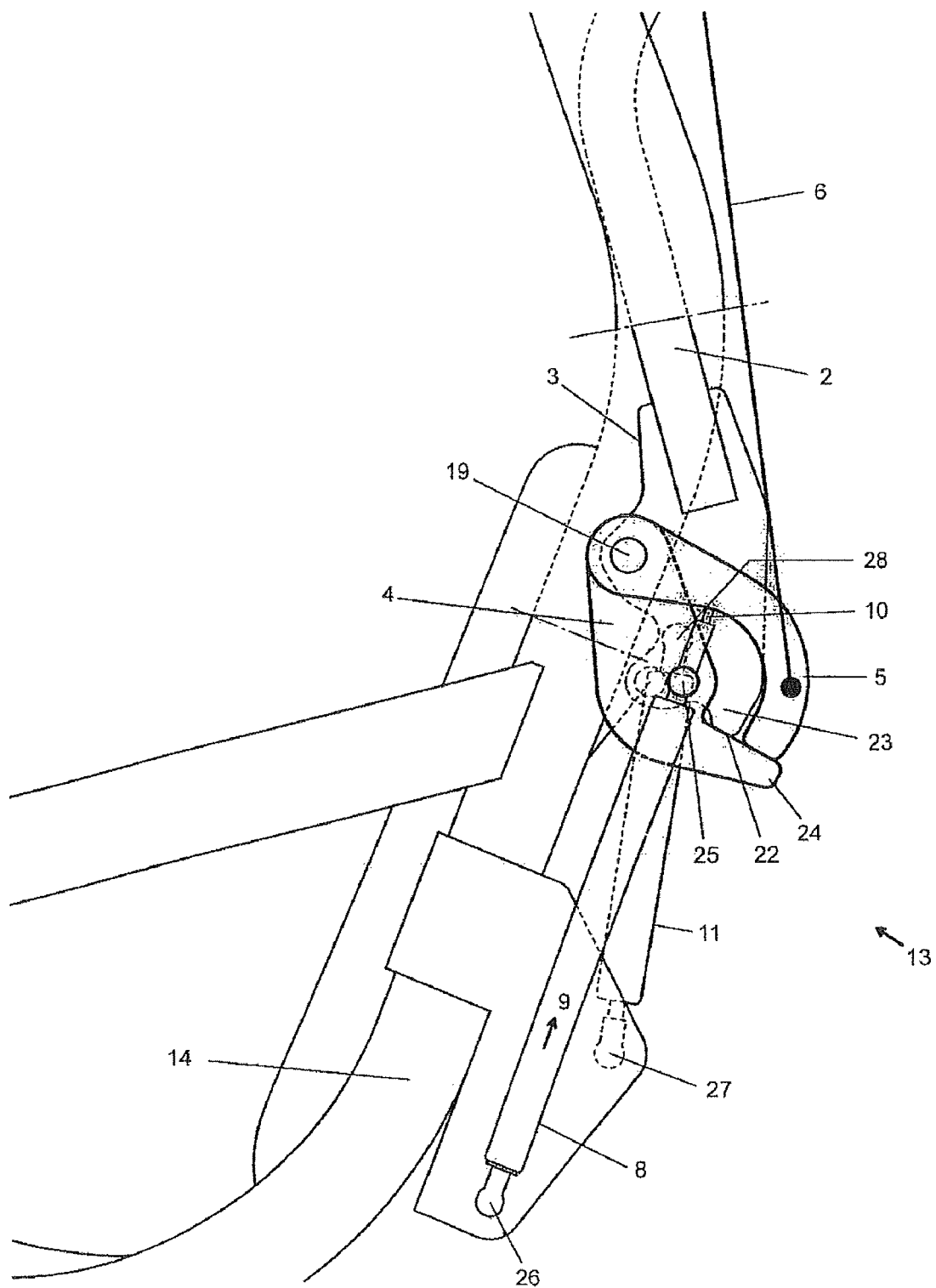
FIG. 3 shows a detail from FIG. 1 on a larger scale.

Referring now to the figures of the drawing in detail and first, particularly, to FIGS. 1 and 2 thereof, an exemplary apparatus according to the invention includes chair 1 of the chair lift with a safety bar 2, having a device 7 for activating the closing operation of the safety bar 2 and also a device 13 for closing the safety bar 2 and blocking the opening operation thereof. The remaining parts of the chair 1 may be conventional as in the prior art. It will therefore only be mentioned in general terms that the safety bar 2 is arranged on a frame 14 which is connected, via a joint 15, to a load-bearing bar 16, at the top end of which is fitted a clamping device 17 for fastening the chair 1 on a conveying cable 18. It is likewise possible, however, for the invention to be used for other forms of chairs, in particular couplable chairs.

Above the chair 1, and preferably in the vicinity of the clamping device 17, the device 7 is fastened on the load-bearing bar 16. The device 7 has a guide roller 12 and is raised (FIG. 2) when the chair 1 passes through a region with a guide device, in particular guide rail, which is assigned to the guide roller 12 and is arranged in the exit region from a station. Arranged upstream of, or in, the entry region to the station is a further guide device, e.g. guide rail, which moves the guide roller 12 back into the position which is illustrated in FIG. 1.

The device 7 has a carrier 30 which is mounted in a pivotable manner on the load-bearing bar 16 via a bearing 31. At the opposite end, the roller 12 is mounted in a rotatable manner on the carrier 30. The device 7 also has a toggle comprising two levers 32 and 33, one lever 32 being mounted in a pivotable manner on the carrier 30, via a joint 34, and the other lever 33 being mounted in the pivotable manner on a holder of the load-bearing bar 16, via a joint 37. The two levers 32 and 33 are connected to one another via a joint 35.

The device 7 can assume the two end positions which are illustrated in FIGS. 1 and 2, and the function of which will be explained in more detail in the following.

The construction according to the invention for a preferred embodiment of the device 13 can best be seen in FIG. 3. The safety bar 2 has a plate-like extension 3, by way of which it is mounted on the frame 14 via a joint 19. A first, bottom actuating lever 4 and a further, top actuating lever 5 are mounted at the same point. One end of the first rod 6 is mounted on the top actuating lever 5. The rod 6 is connected, via a Bowden cable 20, to a second rod 21, the end of which is mounted on the device 7, more specifically by way of the toggle joint 35. The bottom actuating lever 4, at its free end, has a nose 24 which forms an abutment surface 22 for one end 23 of the extension 3 of the safety bar 2. Furthermore, the bottom actuating lever 4 is connected, via a joint 25, to an energy storage device 8 in the form of a spring which, at its opposite end region, is mounted in a pivotable manner on the chair 1, for example on the frame 14 of the chair 1, by way of a joint 26. Within the context of the invention, the spring 8 may be, for example, a pneumatic compression spring, as will be described hereinbelow, which is capable of being relieved of stressing, with its longitudinal extent being increased in the process, in arrow direction 9. According to the invention, the safety bar 2 is caused to close by virtue of the pneumatic compression spring 8 being relieved of stressing. If the pneumatic compression spring 8 is thus relieved of stressing in arrow direction 9, i.e. the energy storage device 8 is discharged, the safety bar 2 pivots downward since the bottom actuating lever 4 is pressed against the end 23 of the extension 3 on the safety bar 2 by way of the abutment surface 22.

In order for it to be possible to subject the pneumatic compression spring 8 to stressing, i.e. in order to decrease its longitudinal extent counter to the arrow direction 9, this spring has at its top end, which is directed toward the top actuating lever 5, a blocking means 10 in the form of a pin which, in the first instance, has to be depressed by the lever 5 since, otherwise, the pneumatic compression spring 8 is blocked against being subjected to stressing. This block, however, acts only against the stressing of the pneumatic compression spring 8, this only being the case when the pin 10 has not been depressed. If the pin 10, as shown in FIG. 3, is depressed by the top actuating lever 5, then the pneumatic compression spring 8 can be compressed, up to its fully stressed state, until the safety bar 2 is fully open (FIG. 1). According to the invention, the safety bar 2 can thus only be opened by virtue of the pneumatic compression spring 8 being subjected to stressing with the pin 10 depressed, i.e. by virtue of the energy storage device 8 being charged. Instead of the above described pneumatic compression spring 8 with the pin 10, it is also possible to use any other suitable form of energy storage device 8 with a blocking means 10 which subjects the safety bar 2 to loading in the closing direction and at least prevents the safety bar 2 from being opened when the blocking means 10 is active.

Also provided is a damper 11, which is mounted in a pivotable manner, on the one hand, on the chair 1, for example on the frame 14 of the chair 1, via a joint 27 and, on the other hand, on the extension 3 of the safety bar 2, via a further joint 28, and controls the speed of movement of the safety bar 2 during the opening and closing operations.

Figure 4:
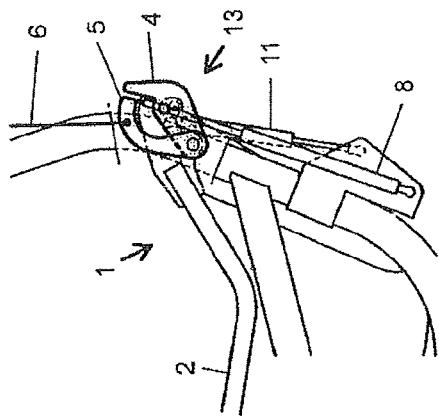
FIGS. 4 to 9 show the detail from FIG. 3, slightly reduced in scale, in individual steps during the closing and opening operations of the safety bar.

The time sequence of the safety bar 2 being pivoted from the open position into the closed position and then back into the open position will be described with reference to FIGS. 4 to 9:

FIG. 4 shows the safety bar 2 in its open position according to FIGS. 1 and 3. The safety bar 2 assumes this position as the chair 1 passes through a station, it being possible for passengers to get into the chair 1 and disembark therefrom. The pin 10 is depressed by the top actuating lever 5, which, for its part, is pushed downward by the device 7, via the rod 6, the Bowden cable 20 and the rod 21 (FIG. 1), and thus keeps the pneumatic compression spring 8 in the stressed state. The nose 24 of the bottom actuating lever 4 butts against the end 23 of the extension 3 of the safety bar 2. In this case, the device 7 is located in the position which is illustrated in FIG. 1, and in which the toggle joint 35 has been pivoted beneath the joint 37, via a dead center, and butts against an abutment surface 36 of the holder on the load-bearing bar 16. It is thus the case that it is no longer possible for the rod 21 to move upward even under the force of the stressed pneumatic compression spring 8.

Figure 5:
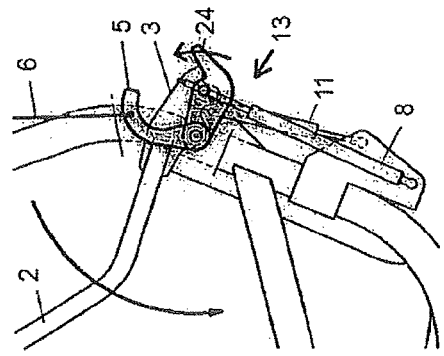

In FIG. 5, the safety bar 2 is still partly open. The chair 1, however, as it exits from the station, is passing through a region with a guide rail which pivots in the upward direction the guide roller 12 of the device 7 on the carrier 30. Via the lever 33, the toggle joint 35 is rotated in the counterclockwise direction out of its dead-center position, in which case the rod 21 moves upward, along with the Bowden cable 20 and the rod 6, and the top actuating lever 5 is pivoted upward.

The rod 6 thus raises the free end of the top actuating lever 5 and keeps it in this position, in which case the top actuating lever 5 no longer pushes the bottom actuating lever 4 downward, and the pneumatic compression spring 8 can begin to be relieved of stressing. By virtue of the pneumatic compression spring 8 being relieved of stressing, the bottom actuating lever 4 pivots upward and presses, by way of its abutment surface 22, against the end 23 of the extension 3 of the safety bar 2, in which case the safety bar 2 is closed.

Even in this position of the safety bar 2, the effect according to the invention, although the closing movement of the closing bar 2 can be stopped, counter to the force of the pneumatic compression spring 8, by a passenger, it is no longer possible for the passenger, on account of the blocking device 13, to open the safety bar 2 again counter to the discharging action of the energy storage device 8, since it should only be possible to compress the pneumatic compression spring 8 if the pin 10 were depressed by the lever 5, is manifested.

Figure 6:
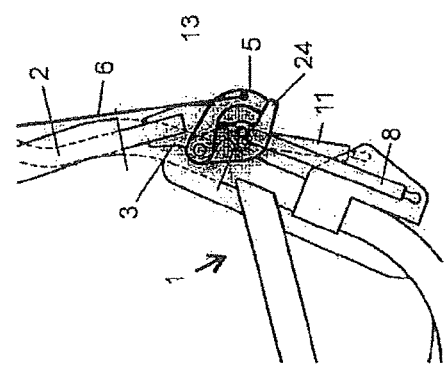

FIG. 6 shows the safety bar 2 in its fully closed position according to FIG. 2. The bottom actuating lever 4 has been pivoted all the way upward and butts, by way of its nose 24, against the end 23 of the extension 3 of the safety bar 2. The top actuating lever 5, however, does not butt against the bottom actuating lever 4. In this position of the safety bar 2, en route from one station to another station of the chair-lift system, the pin 10 is not depressed by the top actuating lever 5, in which case the pneumatic compression spring 8 is not subjected to stressing and it is thus also the case that the safety bar 2 cannot be opened, since the extension 3 of the safety bar 2 is blocked against such movement by the bottom actuating lever 4.

Figure 7:
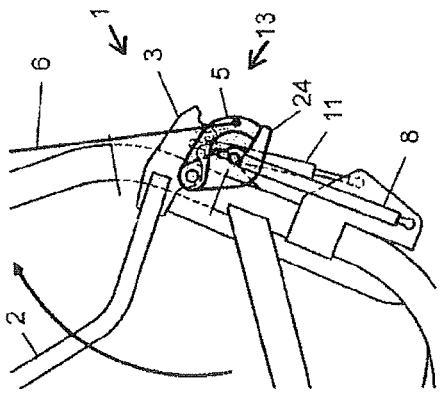
Figure 8:
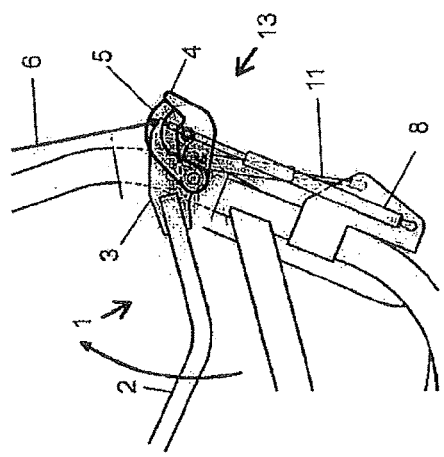

In FIG. 7, the safety bar 2 is still closed, but the chair 1, as it enters into a station, is moving into a region in which the guide roller 12 of the device 7, and with it the rod 21, the Bowden cable 20 and the rod 6, is/are moved downward by a guide rail. The rod 6 thus pushes the free end of the top actuating lever 5 downward, in which case the top actuating lever 5 depresses the pin 10 and the pneumatic compression spring 8 can be subjected to stressing in order for the safety bar 2 to be opened. FIG. 8 shows this position of the device 13 upon movement past the guide rail. The guide roller 12 and thus the rod 21, the Bowden cable 20 and the rod 6 are moved increasingly downward. This means that the top actuating lever 5 is also pushed increasingly downward, during which time the pin 10 remains depressed and the pneumatic compression spring 8 is compressed. It is thus possible for the safety bar 2 to be opened.

In order to provide mechanical assistance for opening the safety bar 2 into the position which is illustrated in FIGS. 1 and 4, use can be made of means which are known from the prior art, for example a spring (not illustrated) which is subjected to stressing as the safety bar is closed.

Figure 9:
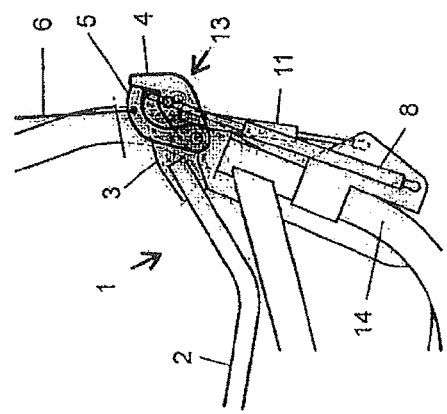

FIG. 9 shows the position of the device 13 during movement through a station once the guide rail has been passed. The rod 6, which interacts with the device 7 in order to subject the energy storage device 8 to stressing and to activate the closing operation of the safety bar 2, remains lowered and keeps the top actuating lever 5 in position. The top actuating lever 5 thus blocks a pivoting movement of the bottom actuating lever 4 in the upward direction, this preventing the situation where the pneumatic compression spring 8 is relieved of stressing and the safety bar 2 is closed accidentally. The safety bar 2, which in the embodiment shown, rather than being provided with any positively controlled or mechanical assistance, is opened manually by the user, is not yet fully open in FIG. 9.

It is clear from the time sequence described that, during the closing operation and also thereafter, the safety bar 2 is permanently blocked against executing an opening movement, until the pneumatic compression spring 8 is released by virtue of the pin 10 being depressed.

In summary, an exemplary embodiment of the invention may be described as follows:

A transporting means of a chair lift or of a cableway system has a safety bar 2, a device 13 for closing the safety bar 2, an energy storage device 8, a device 7 for charging the energy storage device 8 and a blocking device 13 which prevents the energy storage device 8 from being charged. The blocking device 13 can be activated and deactivated, opening of the safety bar 2 being prevented in the active state of the blocking device 13. The blocking device 13 prevents the safety bar 2 from being opened over at least part of the distance covered by the safety bar 2 between its fully open position and its fully closed position, in particular over the entire distance.

The invention claimed is:

1. A transporting means of a chair lift or of a cableway system, comprising:
   a frame connected to a load-bearing bar supported on a conveying cable;
   a safety bar movably disposed between a fully open position and a fully closed position;
   a device for closing said safety bar;
   an energy storage device, a device for charging said energy storage device, and a blocking device for preventing said energy storage device from being charged, said blocking device having an activated state and a deactivated state;
   said blocking device, in said activated state, preventing said safety bar from being opened during a closing operation.

2. The transporting means according to claim 1, wherein said blocking device is configured to prevent said safety bar from being opened over the entire distance covered between said fully open position and said fully closed position.

3. The transporting means according to claim 1, wherein said blocking device and said device for closing said safety bar are comprised of a common group of interacting components.

4. The transporting means according to claim 1, wherein said device for charging said energy storage device is mounted on said load-bearing bar.

5. The transporting means according to claim 1, wherein said device for charging said energy storage device includes a pivotally mounted carrier.

6. The transporting means according to claim 1, wherein said device for charging said energy storage device includes a guide roller.

7. The transporting means according to claim 1, wherein said energy storage device is pivotally mounted.

8. The transporting means according to claim 1, wherein said energy storage device is a spring.

9. The transporting means according to claim 8, wherein said energy storage device is a pneumatic compression spring.

10. The transporting means according to claim 1, which comprises a mechanism connecting said blocking device to said device for charging said energy storage device, and said energy storage device is charged by stressing.

11. The transporting means according to claim 10, wherein said mechanism includes a first rod, a Bowden cable connected to said first rod, and a second rod connected to said Bowden cable.

12. The transporting means according to claim 11, wherein said device for charging said energy storage device includes a toggle joint and said first rod is connected to said toggle joint.

13. The transporting means according to claim 11, wherein said blocking device has a top lever with an abutment surface for blocking means preventing said energy storage device from being charged, and said second rod is connected to said top lever.

14. The transporting means according to claim 1, which comprises a damper pivotally mounted to said frame and said safety bar.

15. The transporting means according to claim 1, wherein said device for charging said energy storage device is a device for activating a closure of said safety bar disposed for stressing said energy storage device.

16. A transporting means of a chair lift or of a cableway system, comprising:
   a frame connected to a load-bearing bar supported on a conveying cable;
   a safety bar movably disposed between a fully open position and a fully closed position;
   a device for closing said safety bar;
   an energy storage device, a device for charging said energy storage device, and a blocking device for preventing said energy storage device from being charged, said blocking device having an activated state and a deactivated state, said device for charging said energy storage device including a toggle joint;
   said blocking device, in said activated state, preventing said safety bar from being opened over at least a part of a distance covered between said fully open position and said fully closed position.

17. A transporting means of a chair lift or of a cableway system, comprising:
   a frame connected to a load-bearing bar supported on a conveying cable;
   a safety bar movably disposed between a fully open position and a fully closed position, said safety bar being formed with an extension;
   a device for closing said safety bar;
   an energy storage device, a device for charging said energy storage device, and a blocking device for preventing said energy storage device from being charged, said blocking device having an activated state and a deactivated state, said blocking device having a bottom lever and a top lever, said bottom lever having a free end formed with an abutment surface for said extension of said safety bar, and said top lever having an abutment surface for blocking means preventing said energy storage device from being charged;
   said blocking device, in said activated state, preventing said safety bar from being opened over at least a part of a distance covered between said fully open position and said fully closed position.

18. The transporting means according to claim 17, wherein said bottom lever and said top lever are mounted on said extension of said safety bar.

19. The transporting means according to claim 17, wherein said bottom lever is connected to said energy storage device.

* * * * *